US012750327B2

(12) United States Patent
Du et al.

(10) Patent No.: US 12,750,327 B2
(45) Date of Patent: Sep. 29, 2026

(54) RESOURCE ALLOCATION METHOD AND APPARATUS

(71) Applicant: Huawei Cloud Computing Technologies Co., Ltd., Guizhou (CN)

(72) Inventors: Tianlin Du, Xi'an (CN); Li Su, Xi'an (CN); Wenli Zhou, Xi'an (CN); Lei Zhu, Xi'an (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 84 days.

(21) Appl. No.: 18/987,483

(22) Filed: Dec. 19, 2024

(65) Prior Publication Data

US 2025/0119392 A1 Apr. 10, 2025

Related U.S. Application Data

(63) Continuation of application No. PCT/CN2023/081415, filed on Mar. 14, 2023.

(30) Foreign Application Priority Data

Jun. 22, 2022 (CN) ......................... 202210713905.8
Sep. 29, 2022 (CN) ......................... 202211200175.8

(51) Int. Cl.
*H04L 47/80* (2022.01)
*H04L 47/70* (2022.01)

(52) U.S. Cl.
CPC .......... *H04L 47/805* (2013.01); *H04L 47/822* (2013.01); *H04L 47/828* (2013.01)

(58) Field of Classification Search
None
See application file for complete search history.

(56) References Cited

U.S. PATENT DOCUMENTS 11,036,554 B1 6/2021 Prock et al.
2017/0288982 A1* 10/2017 Katsaros ................ H04L 67/02

FOREIGN PATENT DOCUMENTS

CN 110383769 A 10/2019
CN 111813512 A 10/2020

* cited by examiner

*Primary Examiner* — Cai Y Chen
(74) *Attorney, Agent, or Firm* — Conley Rose, P.C.

(57) ABSTRACT

A resource allocation method includes: receiving a placement group creation request, where the placement group creation request is for providing placement group creation requirement information for a cloud server, and the placement group creation request includes a target application type and a target SLA; generating placement group creation guide information based on the placement group creation request, where the placement group creation guide information includes a partition quantity of a placement group and an instance specification of the placement group; and creating the placement group based on the placement group creation guide information.

20 Claims, 5 Drawing Sheets

RESOURCE ALLOCATION METHOD AND APPARATUS

CROSS-REFERENCE TO RELATED APPLICATIONS

This is a continuation of Int'l Patent App. No. PCT/CN2023/081415, filed on Mar. 14, 2023, which claims priority to Chinese Patent App. No. 202210713905.8, filed on Jun. 22, 2022, and Chinese Patent App. No. 202211200175.8, filed on Sep. 29, 2022, all of which are incorporated by reference.

FIELD

Embodiments relate to the field of cloud computing, and in particular, to a resource allocation method and apparatus.

BACKGROUND

A cloud computing service is for managing and scheduling a large quantity of computing resources in a unified manner, to form a resource pool and provide services for a user side on demand via a network. In a cloud computing service scenario, a user side can purchase on demand instances provided by a cloud service provider. However, when purchasing an instance, the user side usually puts forward restrictions and tendencies on placement of the instances. For example, the user side requires to place the purchased instances on different hosts to prevent unavailability of the purchased instances due to one of the hosts being faulty.

Currently, a cloud service provides control over a relationship between an instance and a host by creating a placement group. In a process of creating a placement group, a user side can set a partition quantity, and each partition corresponds to a plurality of hosts. After a user creates the placement group, the user side can further create instances in different partitions.

When creating a placement group, a user side cannot determine a quantity of partitions that need to be created for an application. To ensure availability of the application, some users choose to set a large quantity of partitions when creating the placement group. Consequently, the availability of the application exceeds an actual requirement. This causes a waste of resources of a cloud server and low overall utilization of a resource pool.

SUMMARY

Embodiments provide a resource allocation method and apparatus, to improve overall utilization of a resource pool of a cloud server.

A first aspect in embodiments provides a resource allocation method. The method may be performed by a cloud server, or may be performed by a component of the cloud server, for example, a processor, a chip, or a chip system of the cloud server, or may be implemented by a logical module or software that can implement all or some functions of the cloud server. An example in which the method is performed by the cloud server is used. The resource allocation method provided in this embodiment includes: A cloud server side receives a placement group creation request, where the placement group creation request is for providing placement group creation requirement information for the cloud server, and the placement group creation request includes a target application type and a target service-level agreement (SLA).

The cloud server side generates placement group creation guide information based on the placement group creation request, where the placement group creation guide information includes a partition quantity of a placement group and an instance specification of the placement group. The cloud server side creates the placement group based on the placement group creation guide information.

In this embodiment, the cloud server side can generate the placement group creation guide information based on the placement group creation request, the placement group guide information can recommend the partition quantity and the instance specification to a user side, and the user side creates the placement group based on the partition quantity and the instance specification that are recommended by the cloud server. Because the cloud server can recommend the partition quantity and the instance specification of the placement group based on the requirement information of the user side, compared with a manner in which the user side sets a partition quantity and selects an instance specification, this improves overall utilization of resources of the cloud server.

In a possible implementation, the target application type is an application type of a target application carried in the placement group, and the target SLA is a target SLA of the placement group. The target application type is, for example, a remote dictionary server and a load balancing service, and the target SLA is, for example, a probability indicator of service availability.

The cloud server in this embodiment can create a request for a placement group having a plurality of target application types, and provide placement creation guide information, to enrich scenarios in which placement group creation guides are provided.

In a possible implementation, the placement group creation request includes a required partition quantity, a required instance specification, and a required instance quantity of the placement group. After receiving the placement group creation request, the cloud server performs placement group status measurement based on the placement group creation request, to obtain a placement group measurement result, where the placement group measurement result includes an SLA indicator and an instance capacity status of the placement group. The cloud server provides the placement group measurement result.

In this embodiment, the user side may provide a plurality of types of placement group creation requirement information. The cloud server side may perform the placement group status measurement based on the placement group creation requirement information. When a measurement result of a placement group status does not satisfy a requirement of the user side, the user side may re-adjust the placement group creation requirement information, and the cloud server re-performs the placement group status measurement until the measurement result of the placement group status satisfies a user requirement. In this way, the cloud server side performs the placement group status measurement based on the placement group creation request, and the user side modifies the placement group creation request based on the measurement result, to reduce costs of creating a placement group by the user side.

In a possible implementation, in a process in which the cloud server side performs the placement group status measurement based on the placement group creation request, the cloud server side calculates the SLA indicator based on the required partition quantity, the required instance quantity, and a fault rate of the placement group, where the SLA indicator includes a probability of service availability, the fault rate includes a fault rate of each of one or more fault domains in which an instance is distributed, and the fault domain is a physical fault domain of a host corresponding to the placement group.

In this embodiment, the cloud server side can calculate the SLA indicator based on the required partition quantity, the required instance quantity, and the fault rate of the placement group, to improve implementability of the placement group status measurement.

In a possible implementation, in a process in which the cloud server performs the placement group status measurement based on the placement group creation request, the cloud server determines the instance capacity status of the placement group based on the required instance quantity and a quantity of instances that can be created in the placement group, where the instance capacity status indicates a probability of an instance creation failure, and the instance capacity status includes an alert state, a normal state, and a healthy state.

In this embodiment, the cloud server determines the instance capacity status of the placement group based on a difference between the required instance quantity and the quantity of instances that can be created in the placement group, to improve implementability of the placement group status measurement.

In a possible implementation, the cloud server determines, based on a resource capacity and a resource capacity required by a single instance, a quantity of instances that can be created in the placement group, and the cloud server corrects, based on a correction coefficient corresponding to the partition quantity, the quantity of instances that can be created, to obtain a corrected quantity of instances that can be created.

In this embodiment, the cloud server can determine, based on the resource capacity and the resource capacity required by the single instance, the quantity of instances that can be created in the placement group, and correct the quantity of instances that can be created based on the correction coefficient, to improve accuracy of the quantity of instances that can be created and the instance capacity status of the placement group.

In a possible implementation, the cloud server determines the instance capacity status of the placement group based on a difference between the required instance quantity and the corrected quantity of instances that can be created in the placement group. The cloud server calculates the difference between the required instance quantity and the corrected quantity of instances that can be created in the placement group, determines a probability of an instance creation failure based on the difference, and determines the instance capacity status of the placement group based on the probability of an instance creation failure.

In this embodiment, the cloud server can determine the instance capacity status of the placement group based on the resource capacity and the difference between the required instance quantity and the corrected quantity of instances that can be created in the placement group, to improve implementability of the placement group status measurement.

In a possible implementation, in a process in which the cloud server generates the placement group creation guide information based on the placement group creation request, the cloud server determines the placement group creation guide information based on historical creation information, where the historical creation information includes a historical partition quantity and a historical instance specification that satisfy the target SLA. The cloud server side determines, based on the target application type, the historical instance specification and the historical partition quantity corresponding to the historical instance specification, and then the cloud server side calculates an SLA and the instance capacity status of the placement group based on the historical partition quantity and the historical instance specification. When the SLA obtained through calculation satisfies the target SLA, the cloud server determines the historical partition quantity and the historical instance specification as the placement group creation guide information.

In this embodiment, the cloud server determines the placement group creation guide information based on the historical partition quantity and the historical instance that satisfy the target SLA, to improve efficiency of generating the placement group creation guide information.

In a possible implementation, in a process in which the cloud server generates the placement group creation guide information based on the placement group creation request, the cloud server calculates a current SLA and a current instance capacity status based on a first partition quantity and a first instance quantity, where the first partition quantity includes one or more preset partition quantities, and the first instance quantity includes one or more preset instance quantities. When the current SLA satisfies the target SLA and the instance capacity status satisfies a threshold, the partition quantity of the placement group is determined based on the first partition quantity.

In this embodiment, the cloud server side calculates the current SLA and an instance indicator based on all possible partition quantities and instance specifications, such that the cloud server can select an optimal configuration from all partition quantities and instance specifications that satisfy a requirement, thereby improving accuracy of the placement group creation guide information, and further improving overall utilization of resources of the cloud server.

In a possible implementation, the cloud server receives an instance creation request, where the instance creation request includes a quantity of instances that is requested to be created. The cloud server generates instance creation guide information based on the instance creation request, where the instance creation guide information includes an instance capacity status of each partition in the placement group. The cloud server creates an instance in the placement group based on the instance creation guide information.

In this embodiment, the cloud server side can generate the instance creation guide information based on the instance creation request, and the user side can modify, based on the instance creation guide information, a quantity of instances to be created in each partition, to reduce a probability that the user side fails to create an instance in the placement group.

In a possible implementation, the cloud server generates instance creation guide information based on the placement group creation request, where the placement group creation request includes a quantity of instances that is requested to be created, and the instance creation guide information includes an instance capacity status of each partition in the placement group; and the cloud server creates an instance in the placement group based on the instance creation guide information.

In this embodiment, when the placement group creation request includes a quantity of instances to be created for the first time, the cloud server can generate the instance creation guide information based on the placement group creation request, to reduce a probability that the user side fails to create an instance in the placement group.

In a possible implementation, the cloud server calculates the instance capacity status of each partition in the placement group based on a resource pool status, where the resource pool status includes a host capacity corresponding to each partition in the placement group. The cloud server adjusts, based on the instance capacity status of each partition in the placement group, distribution of instances in a host corresponding to the placement group.

In this embodiment, the cloud server side can adjust, based on the instance capacity status of each partition in the placement group, distribution of instances in a host corresponding to the placement group, to reduce fragment space of the host, and release more host capacity to create an instance, thereby increasing a quantity of instances that can be created in the placement group.

In a possible implementation, the cloud server calculates the instance capacity status of each partition in the placement group based on a resource pool status, where the resource pool status includes a host capacity corresponding to each partition in the placement group. The cloud server provides the instance capacity status of each partition in the placement group. The cloud server displays, by using a display interface, the instance capacity status of each partition in the placement group.

In this embodiment, the cloud server can calculate the instance capacity status of each partition in the placement group based on the resource pool status, and display the instance capacity status of each partition in the placement group by using the display interface, to indicate the user to create an instance, thereby improving a probability that the user successfully creates an instance.

In a possible implementation, in a process in which the cloud server adjusts distribution of instances in a host corresponding to the placement group, the cloud server side may receive from the user side a manual adjustment of instance distribution, or the cloud server side adjusts the distribution of instances in one click according to a preset policy. The preset policy includes a policy for minimizing resource fragments of the host.

In this embodiment, the cloud server can adjust, in a plurality of manners, distribution of instances in a host corresponding to the placement group, to increase a quantity of instances that can be created in the placement group.

A second aspect in embodiments provides a resource allocation apparatus. The resource allocation apparatus includes a transceiver unit and a processing unit. The transceiver unit is configured to receive a placement group creation request, where the placement group creation request is for providing placement group creation requirement information for a cloud server, and the placement group creation request includes a target application type and a target SLA. The processing unit is configured to generate placement group creation guide information based on the placement group creation request, where the placement group creation guide information includes a partition quantity of a placement group and an instance specification of the placement group. The processing unit is further configured to create the placement group based on the placement group creation guide information.

In a possible implementation, the target application type is an application type of a target application carried in the placement group, and the target SLA is a target SLA of the placement group.

In a possible implementation, the placement group creation request includes a required partition quantity, a required instance specification, and a required instance quantity of the placement group. The processing unit is further configured to: perform placement group status measurement based on the placement group creation request, to obtain a placement group measurement result, where the placement group measurement result includes an SLA indicator and an instance capacity status of the placement group; and provide the placement group measurement result.

In a possible implementation, the processing unit is configured to calculate the SLA indicator based on the required partition quantity, the required instance quantity, and a fault rate of the placement group, where the fault rate includes a fault rate of each of one or more fault domains in which an instance is distributed, and the fault domain is a physical fault domain of a host corresponding to the placement group.

In a possible implementation, the processing unit is configured to determine the instance capacity status of the placement group based on the required instance quantity and a quantity of instances that can be created in the placement group, where the instance capacity status indicates a probability of an instance creation failure.

In a possible implementation, the processing unit is configured to determine the placement group creation guide information based on historical creation information, where the historical creation information includes a historical partition quantity and a historical instance specification that satisfy the target SLA.

In a possible implementation, the processing unit is configured to: calculate a current SLA and a current instance capacity status of the placement group based on a first partition quantity and a first instance quantity, where the first partition quantity includes one or more preset partition quantities, and the first instance quantity includes one or more preset ECS quantities; and when the current SLA satisfies the target SLA and the current instance capacity status satisfies a threshold, determine the partition quantity of the placement group based on the first partition quantity.

In a possible implementation, the transceiver unit is further configured to receive an instance creation request, where the instance creation request includes a quantity of instances that is requested to be created. The processing unit is further configured to generate instance creation guide information based on the instance creation request, where the instance creation guide information includes an instance capacity status of each partition in the placement group. The processing unit is further configured to create an instance in the placement group based on the instance creation guide information.

In a possible implementation, the processing unit is further configured to: generate instance creation guide information based on the placement group creation request, where the placement group creation request includes a quantity of instances that is requested to be created, and the instance creation guide information includes an instance capacity status of each partition in the placement group; and create an instance in the placement group based on the instance creation guide information.

In a possible implementation, the processing unit is further configured to: calculate the instance capacity status of each partition in the placement group based on a resource pool status, where the resource pool status includes a host capacity corresponding to each partition in the placement group; and adjust, based on the instance capacity status of each partition in the placement group, distribution of instances in a host corresponding to the placement group.

In a possible implementation, the processing unit is further configured to: calculate the instance capacity status of each partition in the placement group based on the resource pool status, where the resource pool status includes the host capacity corresponding to each partition in the placement group; and provide the instance capacity status of each partition in the placement group.

A third aspect in embodiments provides a cloud server, including a processor. The processor is coupled to a memory. The memory is configured to store instructions. When the instructions are executed by the processor, the cloud server is enabled to perform the method according to any one of the first aspect or the possible implementations of the first aspect.

A fourth aspect in embodiments provides a resource allocation system, including user equipment and a cloud server. The cloud server is configured to perform the method according to any one of the first aspect or the possible implementations of the first aspect.

A fifth aspect in embodiments provides a computer-readable storage medium storing instructions. When the instructions are executed, a computer is enabled to perform the method according to any one of the first aspect or the possible implementations of the first aspect.

A sixth aspect in embodiments provides a computer program product. The computer program product includes instructions. When the instructions are executed, a computer is enabled to implement the method according to any one of the first aspect or the possible implementations of the first aspect.

It may be understood that, for beneficial effects that can be achieved by any one of the cloud server, the resource allocation system, the computer-readable medium, or the computer program product provided above, refer to beneficial effects in the corresponding method. Details are not described herein again.

DETAILED DESCRIPTION

Figure 1:
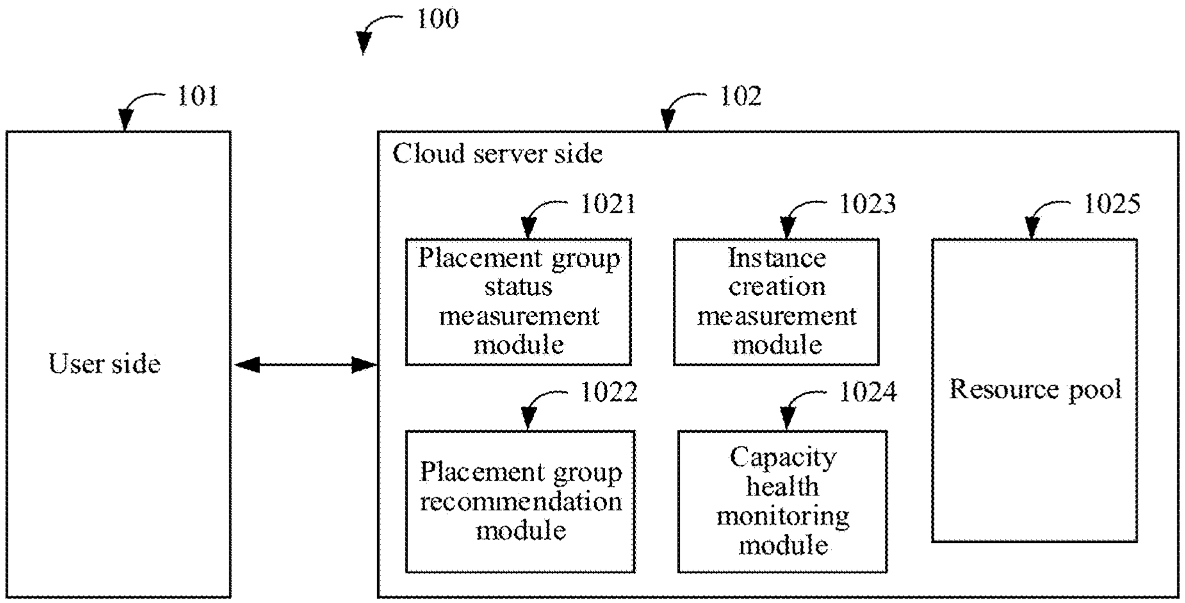
FIG. 1 is a diagram of a system architecture of a resource allocation system according to an embodiment.

Embodiments provide a resource allocation method and apparatus, to improve overall utilization of a resource pool of a cloud server.

In the specification, claims, and accompanying drawings, the terms "first", "second", "third", "fourth", and the like (if any) are intended to distinguish between similar objects but do not necessarily indicate a particular order or sequence. It should be understood that data used in such a way is interchangeable in proper circumstances, such that embodiments described herein can be implemented in an order different from the order illustrated or described herein. In addition, the terms "include" and "have" and any other variants are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

In addition, in embodiments, the term "example" or "for example" is used to represent giving an example, an illustration, or a description. Any embodiment or design solution described as an "example" or "for example" in embodiments should not be explained as being more preferred or having more advantages than another embodiment or design solution. Exactly, use of the term "example", "for example", or the like is intended to present a related concept in a specific manner.

Some terms are first described, to help a person skilled in the art have a better understanding.

A resource is a virtual computing resource in a cloud service, for example, a thread, a process, or a data flow, or may be a hardware resource, for example, a processor, a network connection, or an expansion card.

A resource pool is a collection of hardware and software that are related to a cloud computing data center, and the resource pool is classified into computing resources, storage resources, and network resources based on types.

An elastic cloud server (ECS) is a computing service with scalable processing capabilities, and is also a major cloud service sold by cloud server providers.

Scheduling is a process of allocating resources required by instances in a cloud service.

A resource fragment is a small part of resources that remain after physical resources are allocated but cannot be allocated to instances.

A placement group is a collection of instances, and specific relationships between instances in the placement group can be specified.

A fault domain refers to isolating different physical resources to some extent based on possible faults. Physical resources in a same fault domain may fail to be invoked due to a same fault.

An SLA is an agreement defined between service providers and users or between service providers to ensure performance and reliability of services.

With reference to the accompanying drawings, the following describes a resource allocation method and apparatus provided in embodiments.

FIG. 1 is a diagram of a system architecture to which a resource allocation method is applied according to an embodiment. As shown in FIG. 1, a resource allocation system 100 includes a user side 101 and a cloud server side 102. The cloud server side 102 includes a placement group status measurement module 1021, a placement group recommendation module 1022, an instance creation measurement module 1023, a capacity health detection module 1024, and a resource pool 1025. The following describes functions of the parts in the resource allocation system 100.

The user side 101 is configured to request the cloud server side 102 for creating a placement group and an instance. The user side 101 can implement various target applications on the user side based on the created instance. The target applications include, for example, website database construction, graphics rendering, large-capacity data analysis, and the like.

The cloud server side 102 is configured to provide placement group creation guide information based on a placement group creation request sent by the user side 101, and provide instance creation guide information based on an instance creation request sent by the user side 101, such that the user side 101 creates a placement group based on the placement group creation guide information, and creates an instance based on the instance creation guide information. The following describes functions of modules on the cloud server side 102.

The placement group status measurement module 1021 is configured to measure an SLA that can be satisfied by the placement group. The placement group status measurement module 1021 can perform placement group status measurement based on information carried in the placement group creation request sent by the user side 101, to obtain a measurement result of a placement group status. The measurement result of the placement group status includes an estimated SLA indicator that can be satisfied after the placement group is created. The placement group status measurement module 1021 sends the measurement result to the user side 101, such that the user side 101 modifies the placement group creation request with reference to the measurement result. In this embodiment, the SLA indicator includes a probability of service availability.

The placement group recommendation module 1022 is configured to generate the placement group creation guide information. The placement group recommendation module 1022 generates the placement group creation guide information based on the information carried in the placement group creation request. The placement group creation guide information includes a partition quantity and an instance specification of the placement group. The partition quantity and the instance specification are a partition quantity and an instance specification that are recommended by the cloud server side 102 to the user side 101.

The instance creation measurement module 1023 is configured to generate the instance creation guide information. The instance creation measurement module 1023 generates the instance creation guide information based on information carried in the instance creation request. The instance creation guide information includes an instance capacity status of each partition in the placement group. The instance creation measurement module 1023 can further feed back a predicted creation result to the user side 101 based on the instance creation request sent by the user side 101.

The capacity health detection module 1024 is configured to monitor a quantity of instances in each partition in the placement group. The capacity health detection module 1024 is further configured to arrange distribution of instances in a host corresponding to the placement group, to reduce resource fragments in the host corresponding to the placement group.

The resource pool 1025 is configured to provide an instance for the user side 101, to implement the various target applications on the user side 101. The resource pool 1025 includes a physical host that provides an instance. The resource pool 1025 can monitor and record a resource pool status in real time. The resource pool status includes a used capacity and a remaining capacity of the physical host. The resource pool 1025 can further synchronize usage and remaining conditions of resources in the resource pool to the placement group status measurement module 1021, the placement group recommendation module 1022, the instance creation measurement module 1023, and the capacity health detection module 1024.

The foregoing describes the resource allocation system provided in embodiments. The following describes a resource allocation method provided in embodiments.

Figure 2:
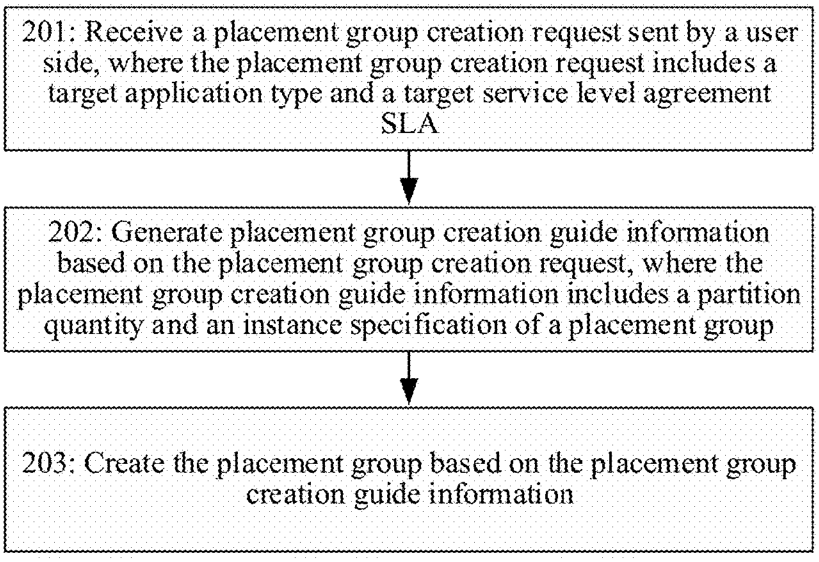
FIG. 2 is a schematic flowchart of a resource allocation method according to an embodiment.

FIG. 2 is a schematic flowchart of a resource allocation method according to an embodiment. The resource allocation method includes the following steps:

201: A cloud server side receives a placement group creation request, where the placement group creation request includes a target application type and a target SLA.

The cloud server side receives the placement group creation request. The placement group creation request is for providing placement group creation requirement information for the cloud server side. The placement group creation request includes the target application type and the target SLA. The target application type is, for example, a remote dictionary server (e.g., Redis) and a load balancing service (e.g., Nginx).

In a possible implementation, a user inputs the placement group creation requirement information via a display interface provided by a cloud server, to generate the placement group creation request. The cloud server side receives the placement group creation request via the display interface.

In this embodiment, the placement group creation request may alternatively directly include an instance specification corresponding to the target application type. In other words, a user side does not need to provide the target application type, and an instance specification of a to-be-created placement group is directly specified in the placement group creation request. Instances in this embodiment include an ECS, a virtual machine, and a container.

In a possible implementation, the placement group creation request further includes one or more of the following information: a required partition quantity, a required instance specification, and a required instance quantity of a placement group. After receiving the placement group creation request from the user side, the cloud server side performs placement group status measurement based on the placement group creation request, to obtain a placement group measurement result. The placement group measurement result includes an SLA indicator and an instance capacity status of the placement group.

The cloud server side provides the placement group measurement result. After obtaining the placement group measurement result, the user side may modify the placement group creation request based on the placement group measurement result. For example, the user side may modify the required partition quantity, the required instance specification, and the required instance quantity of the placement group in the placement group creation request. The following describes a process in which the cloud server side performs placement status measurement based on the placement group creation request.

First, that the cloud server calculates the SLA indicator based on the placement group creation request is described. The SLA indicator includes a probability of service availability. When the placement group creation request includes the required partition quantity and the required instance quantity, the cloud server calculates the corresponding SLA indicator based on the placement group creation request. The SLA indicator is calculated based on the required partition quantity, the required instance quantity, an anti-fault rate, and a fault rate of the placement group. The fault rate includes a fault rate of each of one or more fault domains in which an instance is distributed, and the fault domain is a physical fault domain of a host corresponding to the placement group. The anti-fault rate includes an allowed instance fault ratio that does not affect a service of a target application.

For example, in the placement group creation request, the required partition quantity is 10, and the required instance quantity is 100, where each partition corresponds to one top-of-rack (TOR), and each rack corresponds to five hosts. In other words, 100 instances that are expected to be created by the user side are distributed in 50 hosts corresponding to the placement group. It is assumed that a fault rate of the racks is p, a fault rate of the hosts is q, and an anti-fault rate is ⅕, that is, the allowed instance fault ratio that does not affect the service of the target application is ⅕. The probability P of the service availability of the placement group satisfies the following formula:

$$P = 1 - \left( \sum_{i=8}^{10} C_{10}^{i} p^{i} (1-p)^{10-i} + \sum_{i=40}^{50} C_{50}^{i} q^{i} (1-q)^{50-i} \right)$$

Second, that the cloud server calculates the instance capacity status of the placement group based on the placement group creation request is described. The instance capacity status indicates a probability of an instance creation failure. When the placement group creation request includes the required instance specification and the required instance quantity, the cloud server determines the instance capacity status of the placement group based on the placement group creation request.

The cloud server side calculates a difference between the required instance quantity and a quantity of instances that can be created in the placement group, determines a corresponding probability of an instance creation failure based on the difference, and determines the instance capacity status of the placement group based on the probability X of the instance creation failure. The instance capacity status includes an alert state, a normal state, and a healthy state. For example, when $X<10\%$, the instance capacity status is healthy; when $10\% \le X \le 90\%$, the instance capacity status is normal; and when $X>90\%$, the instance capacity status is alert.

The quantity S of instances that can be created satisfies the following formula:

$$S = \sum_{i} \min_{j} \left( \frac{a_{i,j}}{b_j} \right)$$

$a_{i,j}$ is a capacity of resources in a $j^{th}$ dimension of an $i^{th}$ host that satisfy a partition constraint, and $b_j$ is a capacity required by a single instance for the $j^{th}$ dimension of resources.

In a possible implementation, before calculating the difference between the required instance quantity and the quantity of instances that can be created in the placement group, the cloud server side further needs to consider, when determining the quantity of instances that can be created, a correction coefficient α corresponding to a partition quantity. Each partition quantity corresponds to one correction coefficient. The cloud server side corrects, based on the correction coefficient, the quantity of instances that can be created, and then calculates a difference based on a corrected quantity of instances that can be created.

Figure 3:
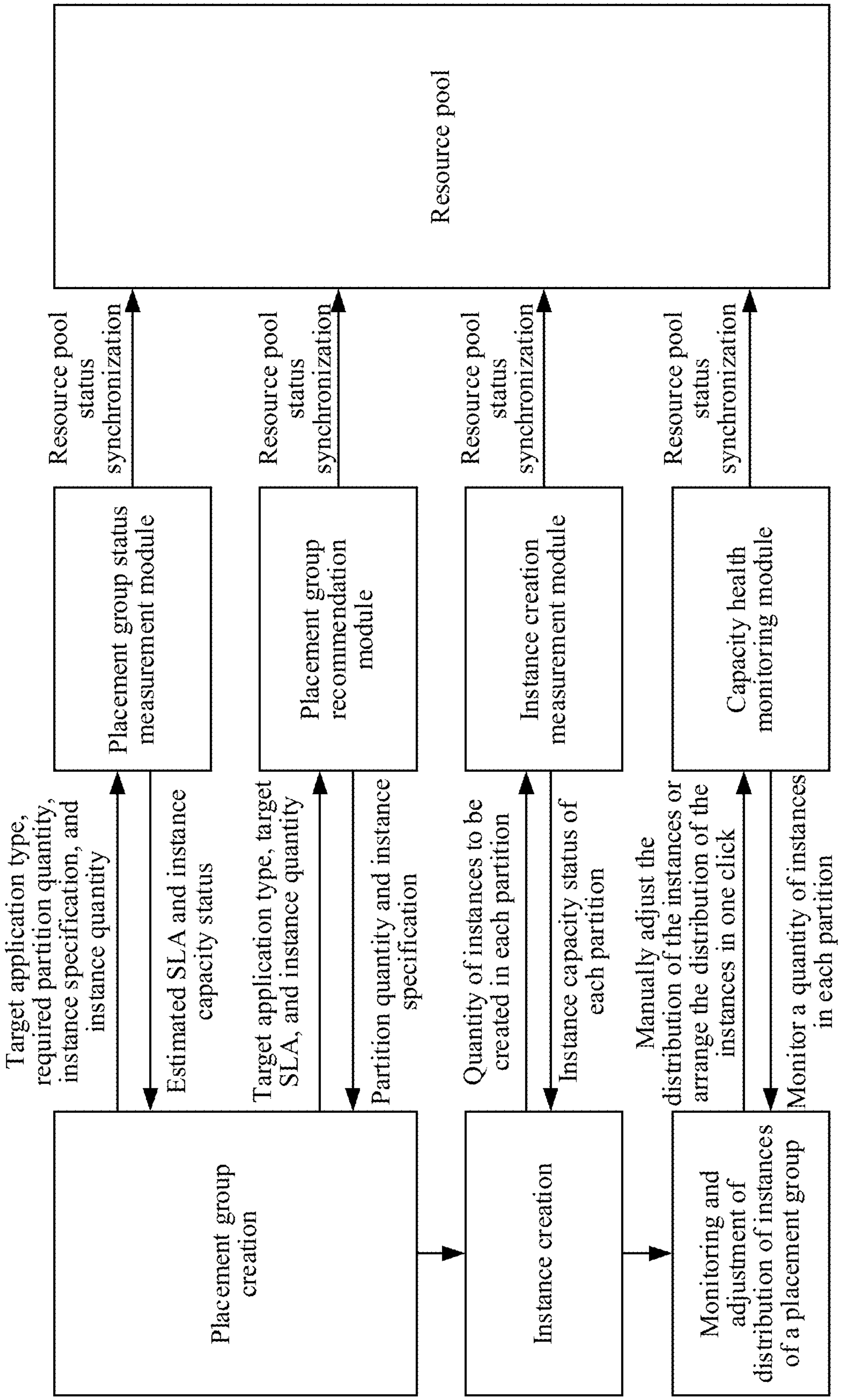
FIG. 3 is a schematic flowchart of another resource allocation method according to an embodiment.

FIG. 3 is a schematic flowchart of another resource allocation method according to an embodiment. In an example shown in FIG. 3, in a process of creating a placement group, a placement group status measurement module on a cloud server side determines an estimated SLA and an instance capacity status of the placement group based on a target application type, a required partition quantity, a required instance specification, and a required instance quantity that are inputted by a user side. The user side may remodify requirement information in a placement group creation request based on the estimated SLA and instance capacity status. Requirements include the target application type, the required partition quantity, the required instance specification, and the required instance quantity.

Figure 4:
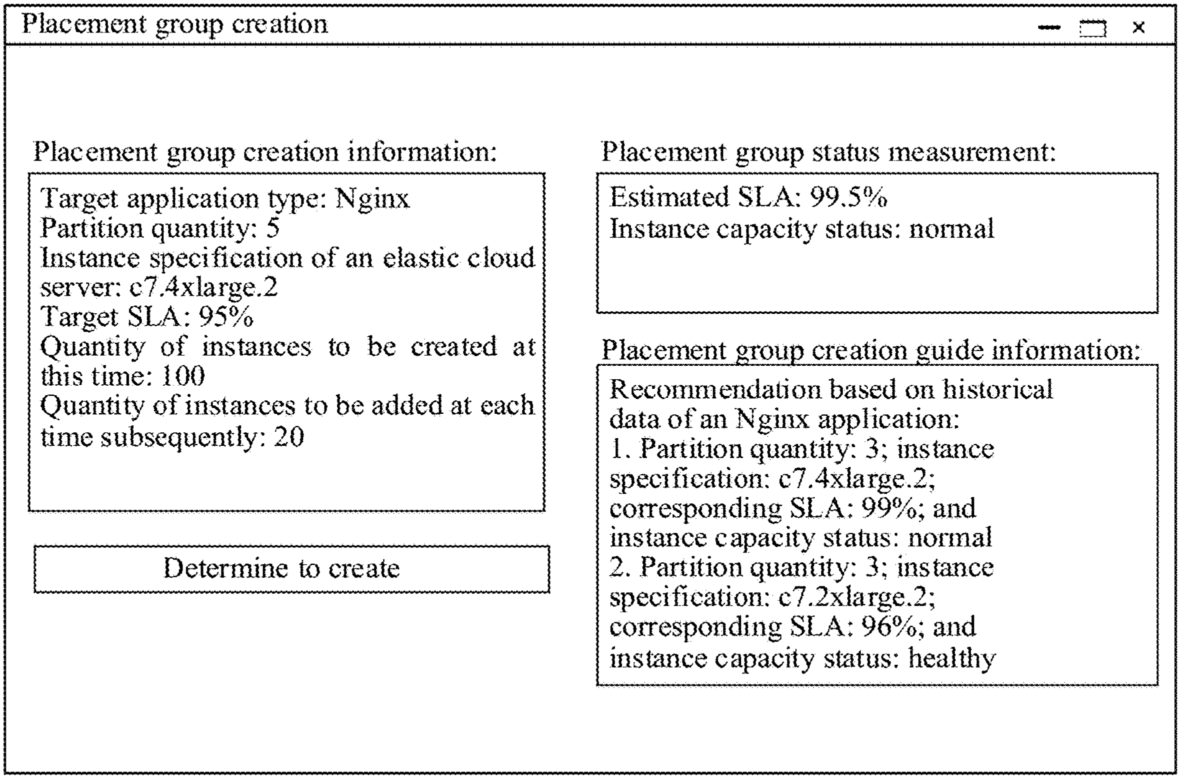
FIG. 4 is a diagram of a placement group creation interface according to an embodiment.

FIG. 4 is a diagram of a creation interface of creating a placement group by a user side according to an embodiment. In an example shown in FIG. 4, after the user side inputs or selects placement group creation requirement information on the creation interface, a cloud server side performs placement group status measurement based on placement group creation requirement information inputted by the user side, to obtain an estimated SLA and an instance capacity status that correspond to the placement group creation requirement information. The user side may adjust the placement group creation requirement information based on a measurement result from the cloud server side.

In the example shown in FIG. 4, the placement group creation requirement information inputted by a user is "target application type: Nginx; partition quantity: 5; instance specification: c7.4×large.2; target SLA: 95%; quantity of instances to be created at this time: 100; and quantity of instances to be added at each time subsequently: 20". Placement group status information obtained through measurement of the cloud server side is "estimated SLA: 99.5%; and instance capacity status: normal". The SLA obtained through measurement of the cloud server side is 99.5%, which exceeds the target SLA inputted by the user side. In this case, the user side may adjust the placement group creation requirement information, for example, downgrade the instance specification, to reduce costs of placement group creation.

202: The cloud server side generates placement group creation guide information based on the placement group creation request, where the placement group creation guide information includes a partition quantity and the instance specification of the placement group.

The cloud server side generates the placement group creation guide information based on the placement group creation request, where the placement group creation guide information includes the partition quantity of the placement group and the instance specification of the placement group. The cloud server side generates the placement group creation guide information in a plurality of manners. Details are described below.

1. The Placement Group Creation Guide Information is Determined Based on Historical Creation Information.

The cloud server side determines the placement group creation guide information based on the historical creation information, where the historical creation information includes a historical partition quantity and a historical instance specification that satisfy the target SLA. The cloud server side determines, based on the target application type, the historical instance specification and the historical partition quantity corresponding to the historical instance specification, and then the cloud server side calculates an SLA and an instance capacity status of the placement group based on the historical partition quantity and the historical instance specification. When the SLA obtained through calculation satisfies the target SLA, the cloud server determines the historical partition quantity and the historical instance specification as the placement group creation guide information.

In a possible implementation, the cloud server side determines a required instance specification based on a load status in 75th percentile of the target application type in historical data, and the cloud server calculates the SLA and the instance capacity status of the placement group based on a quantity of all instances that satisfy the instance specification.

Still refer to FIG. 4. In the example shown in FIG. 4, the cloud server generates a plurality of pieces of placement group creation guide information based on historical creation information of the Nginx application, for the user side to select. For example, the cloud server side generates two pieces of placement group creation guide information based on the historical creation information, and SLAs in the two pieces of placement group creation guide information are both greater than or equal to 95%, which satisfy the target SLA. A first piece of placement group creation guide information is "partition quantity: 3; instance specification: c7.4×large.2; corresponding SLA: 99%; and instance capacity status: normal". A second piece of placement group creation guide information is "partition quantity: 3; instance specification: c7.2×large.2; corresponding SLA: 96%; and instance capacity status: healthy".

2. The Placement Group Creation Guide Information is Determined Based on the Target SLA and the Target Application Type.

The cloud server side calculates an SLA and an instance capacity status based on a first partition quantity and a first instance quantity. The first partition quantity includes one or more preset partition quantities, and the first instance quantity includes one or more preset instance quantities. The cloud server side calculates the SLA and the instance capacity status based on different partition quantities and instance quantities. When the SLA satisfies the target SLA and the instance capacity status satisfies a preset threshold, the cloud server side determines the partition quantity of the placement group based on the first partition quantity, and the cloud server side determines an instance quantity and the instance specification of the placement group based on the first instance quantity.

For example, the first partition quantity may be 3 to 5, and the first instance quantity may be 80 to 100. The cloud server side calculates the SLA and the instance capacity status based on the first partition quantity and the first instance quantity. When the SLA satisfies the target SLA and the instance capacity status satisfies the preset threshold, for example, the SLA obtained through calculation satisfies the target SLA and the instance capacity status satisfies the preset threshold when the partition quantity is 3 and the instance quantity is 90, a partition quantity recommended by the cloud server side is 3, and an instance quantity recommended by the cloud server side is 90.

It may be understood that, when solutions corresponding to a plurality of first partition quantities and a plurality of first instance quantities satisfy the foregoing target SLA and instance capacity status, the cloud server side may recommend a partition quantity, an instance quantity, and an instance specification with lower costs to the user side.

Still refer to FIG. 3. In the example shown in FIG. 3, in the process of creating the placement group, a placement group creation module on the cloud server side determines a partition quantity and an instance specification based on the target application type, the target SLA, and the required instance quantity that are inputted by the user side. The user side may modify the required partition quantity and the required instance specification in the placement group creation request based on a partition quantity and an instance specification that are recommended by the cloud server side.

3. The User Side Determines the Placement Group Creation Guide Information Based on a Measurement Result of a Placement Group Status.

The user side may alternatively select, based on the measurement result of the placement group status, a partition quantity and an instance specification of a to-be-created placement group. In this case, a recommended partition quantity and a recommended instance specification in the placement group creation guide information is the required partition quantity and the required instance specification in the placement group creation request from the user side.

When the SLA that is correspondingly calculated based on the required partition quantity and the required instance specification in the placement group creation request satisfies the target SLA, and the correspondingly calculated placement group capacity status satisfies a preset threshold, the user side uses the required partition quantity and the required instance specification in the placement group creation request as the placement group creation guide information, and creates the placement group.

203: The cloud server side creates the placement group based on the placement group creation guide information.

The cloud server side creates the placement group based on the placement group creation guide information. After the user side modifies the placement group creation requirement information based on the creation guide information, the cloud server side creates the placement group based on the partition quantity and the instance specification that are recommended by the creation guide information.

In a possible implementation, after creating the placement group based on the placement group creation guide information, the cloud server side receives an instance creation request, where the instance creation request includes a quantity of instances that is requested to be created. The cloud server side generates instance creation guide information based on the instance creation request, where the instance creation guide information includes an instance capacity status of each partition in the placement group and an estimated instance creation result. After the user side confirms the instance creation request based on the instance creation guide information, a cloud server side creates an instance in the placement group based on the instance creation guide information.

In a possible implementation, the placement group creation request includes a quantity of instances that the user requests to create. The cloud server generates instance creation guide information based on the placement group creation request, where the instance creation guide information includes an instance capacity status of each partition in the placement group; and the cloud server creates an instance in the placement group based on the instance creation guide information.

In a possible implementation, the cloud server calculates the instance capacity status of each partition in the placement group based on a resource pool status, where the resource pool status includes a host capacity corresponding to each partition in the placement group, and the cloud server provides the instance capacity status of each partition in the placement group.

Still refer to FIG. 3. In the example shown in FIG. 3, in a process of creating an instance, an instance creation measurement module on the cloud server side determines an instance capacity status of each partition based on a required instance quantity of each partition inputted by the user side. The user side may modify a quantity of instances in each partition in the instance creation request based on the instance capacity status of each partition.

Figure 5:
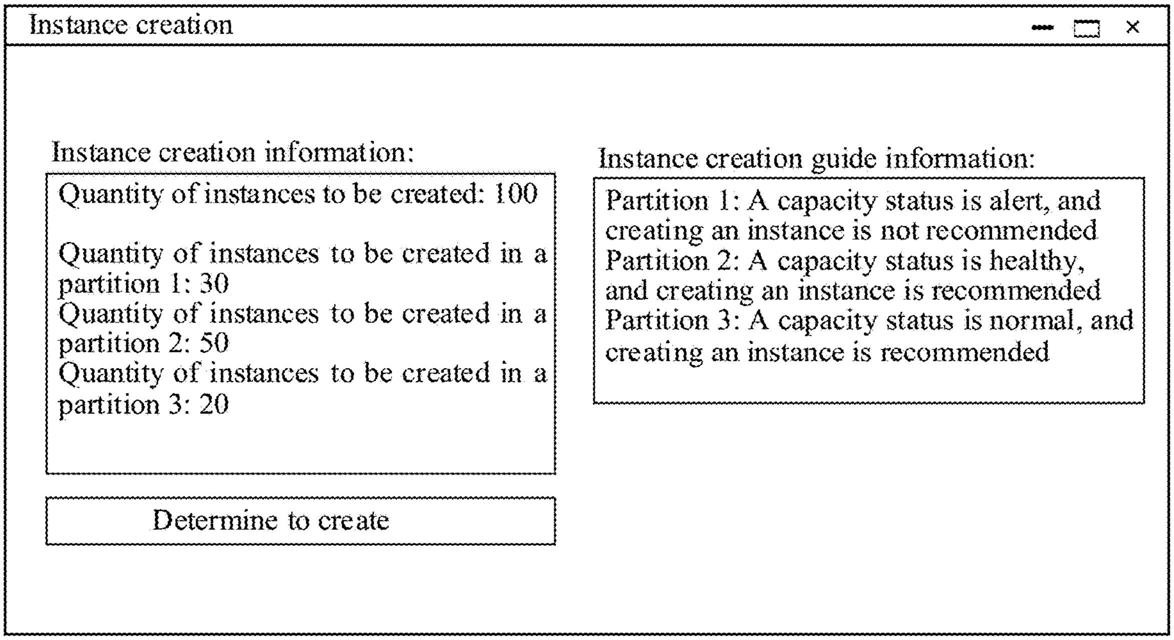
FIG. 5 is a diagram of an instance creation interface according to an embodiment.

FIG. 5 is a diagram of an instance creation interface according to an embodiment. In an example shown in FIG. 5, after a user side inputs or selects a quantity of instances to be created in each partition, a cloud server side calculates an instance capacity status of each partition based on a difference between the quantity of instances to be created in each partition and a quantity of instances that can be created in each partition, and displays an instance status of each partition on the instance creation interface.

For example, in the example shown in FIG. 5, in instance creation information inputted by the user side, a quantity of instances to be created is 100. A quantity of instances to be created in a partition 1 is 30, a quantity of instances to be created in a partition 2 is 50, and a quantity of instances to be created in a partition 3 is 20. The cloud server side generates instance creation guide information based on the quantity of instances in each partition and the quantity of instances that can be created in each partition. In the instance creation guide information, a capacity state of the partition 1 is alert, and creating an instance is not recommended. A capacity state of the partition 2 is healthy, and creating an instance is recommended. A capacity state of the partition 3 is normal, and creating an instance is recommended.

In this embodiment, the cloud server can recommend the partition quantity and the instance specification of the placement group based on the requirement information of the user side. Compared with a manner in which a user sets a partition quantity of the placement group and selects an instance specification, this improves overall utilization of resources of the cloud server. In addition, the cloud server side can generate the instance creation guide information based on the instance creation request, and the user side can modify, based on the instance creation guide information, a quantity of instances to be created in each partition in the instance creation request, to reduce a probability that the user side fails to create an instance in the placement group.

In a possible implementation, the cloud server side monitors the resource pool status corresponding to the placement group, and the cloud server side calculates, based on the resource pool status, a quantity of instances that can be created in each partition in the placement group and the instance capacity status of each partition, where the resource pool status includes the host capacity corresponding to each partition in the placement group. The cloud server side adjusts, based on the instance capacity status of each partition in the placement group, distribution of instances in a host corresponding to the placement group. The cloud server side may receive, from the user side, a manual adjustment of instance distribution, or the cloud server side adjusts the distribution of instances in one click according to a preset policy. The preset policy is, for example, a criterion for minimizing resource fragments of the host corresponding to the placement group. Still refer to FIG. 3. In the example shown in FIG. 3, in a process of monitoring instance distribution in the placement group, a capacity health detection module on the cloud server side arranges, based on an instance distribution adjustment request from the user side, distribution of instances in the placement group in a host corresponding to the placement group. After the adjustment, the quantity of instances that can be created in each partition in the placement group changes. The instance distribution adjustment request includes a one-click arrangement request triggered by the user side and a manual adjustment request triggered by the user side.

Figure 6:
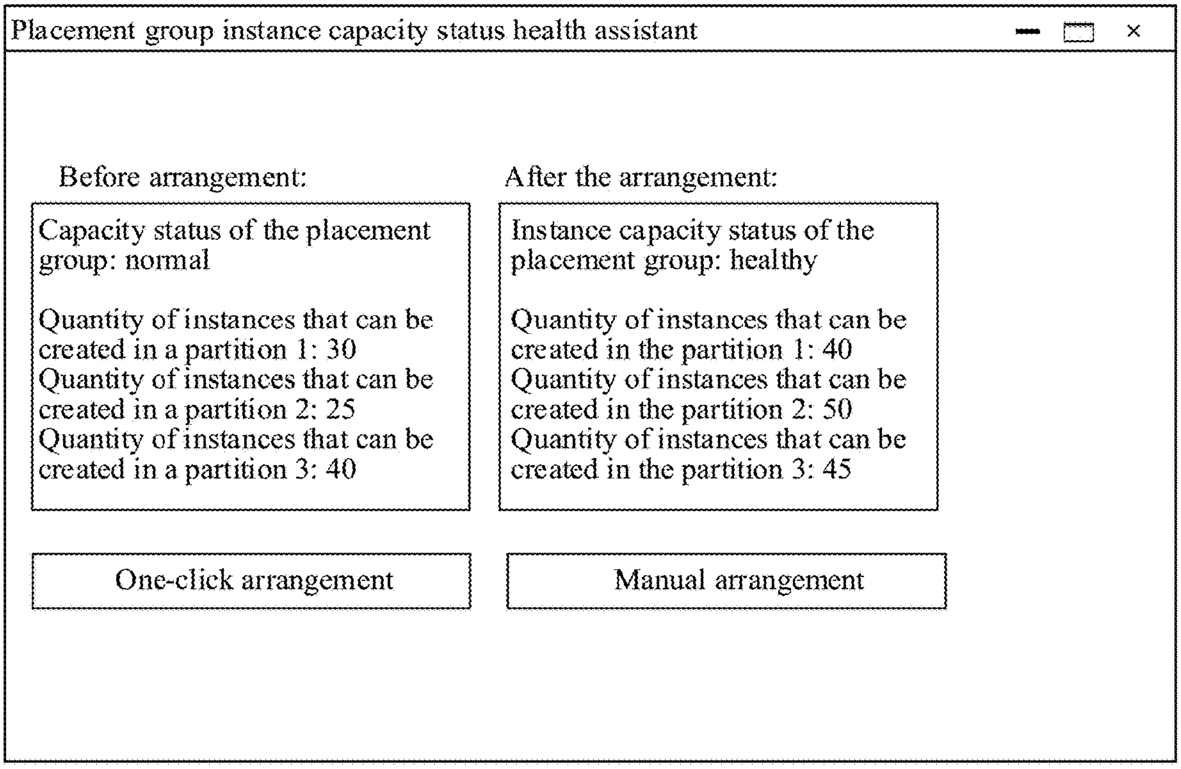
FIG. 6 is a diagram of an interface of an instance capacity status health assistant according to an embodiment.

FIG. 6 is a diagram of an interface of a placement group instance capacity status health assistant according to an embodiment. In an example shown in FIG. 6, a cloud server side monitors a quantity of instances that can be created in each partition in the placement group and an instance capacity status of the placement group. For example, the cloud server side monitors a quantity of instances that can be created in each partition before the placement group is arranged. A quantity of instances that can be created in a partition 1 is 30, a quantity of instances that can be created in a partition 2 is 25, and a quantity of instances that can be created in a partition 3 is 40. The cloud server side detects that the instance capacity status of the placement group is normal.

In the example shown in FIG. 6, a user side may manually adjust distribution of instances in the placement group in a host. To be specific, a user side may manually move an instance from a host A to a host B, to avoid a waste of a capacity of the host B. The user side may alternatively adjust the distribution of instances in the placement group in a host by using the "one-click arrangement" button on the display interface, to improve the instance capacity status of the placement group. For example, in the example shown in FIG. 6, in the arranged placement group, a quantity of instances that can be created in the partition 1 is 40, a quantity of instances that can be created in the partition 2 is 50, and a quantity of instances that can be created in the partition 3 is 45. The instance capacity status of the arranged placement group is healthy.

In this embodiment, a cloud server can monitor an instance capacity status of each partition in the placement group, and adjust, based on the instance capacity status of each partition in the placement group, distribution of instances in a host corresponding to the placement group, to reduce fragment space of the host, and increase a quantity of instances that can be created in the placement group.

The foregoing describes the resource allocation method provided in embodiments. The following describes an apparatus provided in embodiments with reference to the accompanying drawings.

Figure 7:
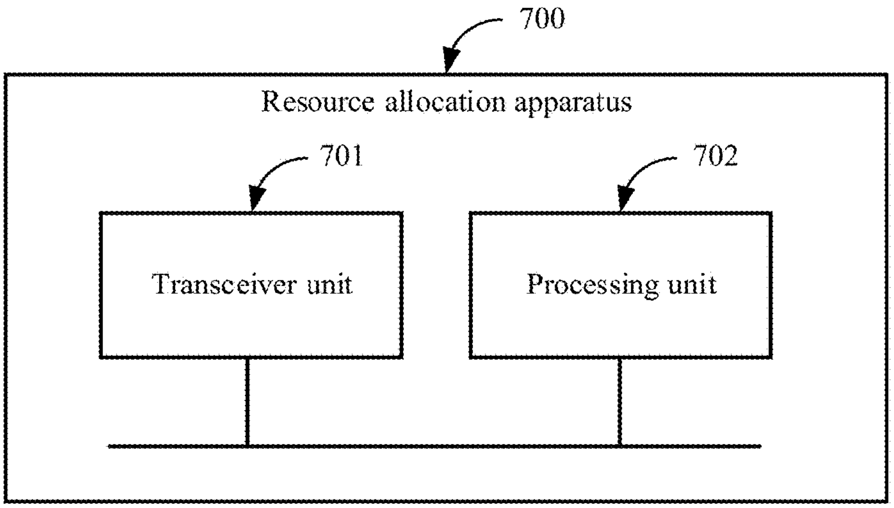
FIG. 7 is a diagram of a structure of a resource allocation apparatus according to an embodiment.

FIG. 7 is a diagram of a structure of a resource allocation apparatus according to an embodiment. The apparatus is configured to implement the steps performed by the cloud server in the foregoing embodiments. As shown in FIG. 7, the resource allocation apparatus 700 includes a transceiver unit 701 and a processing unit 702.

The transceiver unit 701 is configured to receive a placement group creation request, where the placement group creation request is for providing placement group creation requirement information for a cloud server, and the placement group creation request includes a target application type and a target SLA. The processing unit 702 is configured to generate placement group creation guide information based on the placement group creation request, where the placement group creation guide information includes a partition quantity of a placement group and an instance specification of the placement group. The processing unit 702 is further configured to create the placement group based on the placement group creation guide information.

In a possible implementation, the target application type is an application type of a target application carried in the placement group, and the target SLA is a target SLA of the placement group.

In a possible implementation, the placement group creation request includes a required partition quantity, a required instance specification, and a required instance quantity of the placement group. The processing unit 702 is further configured to: perform placement group status measurement based on the placement group creation request, to obtain a placement group measurement result, where the placement group measurement result includes an SLA indicator and an instance capacity status of the placement group; and provide the placement group measurement result.

In a possible implementation, the processing unit 702 is configured to calculate the SLA indicator based on the required partition quantity, the required instance quantity, and a fault rate of the placement group, where the fault rate includes a fault rate of each of one or more fault domains in which an instance is distributed, and the fault domain is a physical fault domain of a host corresponding to the placement group.

In a possible implementation, the processing unit 702 is configured to determine the instance capacity status of the placement group based on the required instance quantity and a quantity of instances that can be created in the placement group, where the instance capacity status indicates a probability of an instance creation failure.

In a possible implementation, the processing unit 702 is configured to determine the placement group creation guide information based on historical creation information, where the historical creation information includes a historical partition quantity and a historical instance specification that satisfy the target SLA.

In a possible implementation, the processing unit 702 is configured to: calculate a current SLA and a current instance capacity status of the placement group based on a first partition quantity and a first instance quantity, where the first partition quantity includes one or more preset partition quantities, and the first instance quantity includes one or more preset ECS quantities; and when the current SLA satisfies the target SLA and the current instance capacity status satisfies a threshold, determine the partition quantity of the placement group based on the first partition quantity.

In a possible implementation, the transceiver unit 701 is further configured to receive an instance creation request, where the instance creation request includes a quantity of instances that is requested to be created. The processing unit 702 is further configured to generate instance creation guide information based on the instance creation request, where the instance creation guide information includes an instance capacity status of each partition in the placement group. The processing unit 702 is further configured to create an instance in the placement group based on the instance creation guide information.

In a possible implementation, the processing unit 702 is further configured to: generate instance creation guide information based on the placement group creation request, where the placement group creation request includes a quantity of instances that is requested to be created, and the instance creation guide information includes an instance capacity status of each partition in the placement group; and create an instance in the placement group based on the instance creation guide information.

In a possible implementation, the processing unit 702 is further configured to: calculate the instance capacity status of each partition in the placement group based on a resource pool status, where the resource pool status includes a host capacity corresponding to each partition in the placement group; and adjust, based on the instance capacity status of each partition in the placement group, distribution of instances in a host corresponding to the placement group.

In a possible implementation, the processing unit 702 is further configured to: calculate the instance capacity status of each partition in the placement group based on the resource pool status, where the resource pool status includes the host capacity corresponding to each partition in the placement group; and provide the instance capacity status of each partition in the placement group.

It should be understood that division of the units in the foregoing apparatus is merely logical function division. During actual implementation, all or some of the units may be integrated into one physical entity, or may be physically separated. In addition, all of the units in the apparatus may be implemented in a form of software invoked by a processing element, or may be implemented in a form of hardware; or some units may be implemented in a form of software invoked by a processing element, and some units may be implemented in a form of hardware. For example, each unit may be a separately disposed processing element, or may be integrated into a chip of the apparatus for implementation. In addition, each unit may alternatively be stored in a memory in a form of a program to be invoked by a processing element of the apparatus to perform a function of the unit. In addition, all or some of the units may be integrated, or may be implemented independently. The processing element herein may also be referred to as a processor, and may be an integrated circuit having a signal processing capability. During implementation, steps in the foregoing method or the foregoing units may be implemented by using a hardware integrated logic circuit in a processor element, or may be implemented in a form of software invoked by the processing element.

It should be noted that, for brief description, the foregoing method embodiment is represented as a series of action combinations. However, a person skilled in the art should know that this disclosure is not limited to the described order of the actions. In addition, a person skilled in the art should also know that all of embodiments described in this specification are example embodiments, and related actions are not necessarily required.

Another appropriate step combination that can be figured out by a person skilled in the art according to the content described above also falls within the protection scope of this disclosure.

Figure 8:
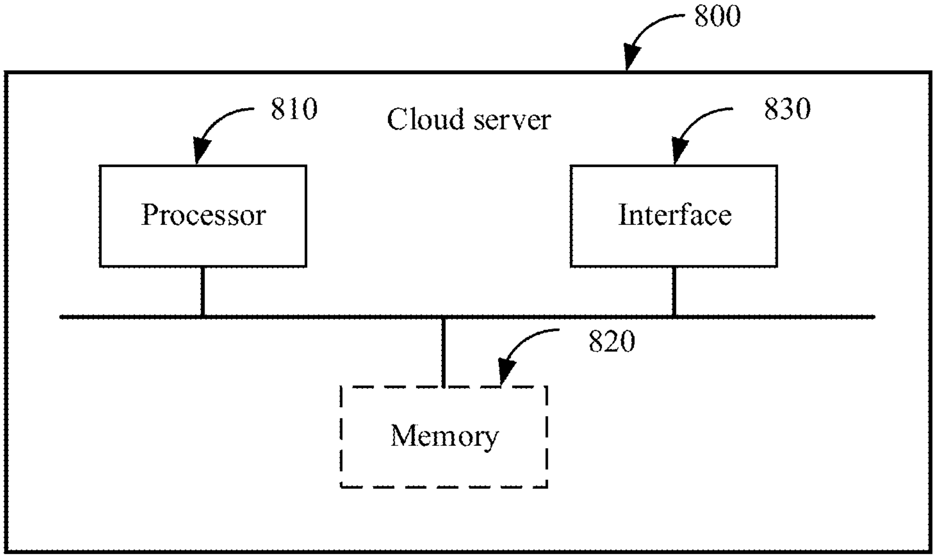
FIG. 8 is a diagram of a structure of a cloud server according to an embodiment.

FIG. 8 is a diagram of a cloud server according to an embodiment. As shown in FIG. 8, the cloud server 800 includes a processor 810, a memory 820, and an interface 830. The processor 810, the memory 820, and the interface 830 are coupled through a bus. The memory 820 stores instructions. When instructions in the memory 820 are executed, the cloud server 800 performs the method performed by the cloud server in the foregoing method embodiment.

The cloud server 800 may be one or more integrated circuits configured to implement the foregoing method, for example, one or more application-specific integrated circuits (ASICs), one or more digital signal processors (DSPs), one or more field-programmable gate arrays FPGAs), or a combination of at least two of these integrated circuit forms. For another example, when units in an apparatus are implemented in a form of scheduling a program by a processing element, the processing element may be a general-purpose processor, for example, a central processing unit (CPU), or another processor that may invoke the program. For another example, the units may be integrated and implemented in a form of a system-on-a-chip (SoC).

The processor 810 may be a CPU, another general-purpose processor, a DSP, an ASIC, an FPGA, another programmable logic device, a transistor logic device, a hardware component, or any combination thereof. The general-purpose processor may be a microprocessor, another processor, or the like.

The memory 820 may be a volatile memory or a non-volatile memory, or may include both a volatile memory and a non-volatile memory. The non-volatile memory may be a read-only memory (ROM), a programmable ROM (PROM), an erasable PROM (EPROM), an electrically erasable PROM (EEPROM), or a flash memory. The volatile memory may be a random-access memory (RAM) used as an external cache. By way of examples but not limitative descriptions, many forms of RAMs may be used, for example, a static RAM (SRAM), a dynamic RAM (DRAM), a synchronous DRAM (SDRAM), a double data rate SDRAM (SDRAM), an enhanced SDRAM (ESDRAM), a synchronous-link DRAM (SLDRAM), and a direct Rambus (DR) RAM.

In addition to a data bus, the bus may further include a power bus, a control bus, a state signal bus, and the like. The bus may be a Peripheral Component Interconnect Express (PCIe) bus, an Extended Industry Standard Architecture (EISA) bus, a unified bus (Ubus or UB), a Compute Express Link (CXL), a cache coherent interconnect for accelerators (CCIX), or the like. The bus may include an address bus, a data bus, a control bus, and the like.

In another embodiment, a computer-readable storage medium is further provided. The computer-readable storage medium stores computer-executable instructions. When a processor of a device executes the computer-executable instructions, the device performs the method performed by the cloud server in the foregoing method embodiment.

In another embodiment, a computer program product is further provided. The computer program product includes computer-executable instructions, and the computer-executable instructions are stored in a computer-readable storage medium. When a processor of a device executes the computer-executable instructions, the device performs the method performed by the cloud server in the foregoing method embodiment.

It may be clearly understood by a person skilled in the art that, for the purpose of convenient and brief description, for a detailed working process of the foregoing described system, apparatus, and unit, reference may be made to a corresponding process in the foregoing method embodiment, and details are not described herein again.

In the several embodiments provided, it should be understood that the disclosed system, apparatus, and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions may be implemented in the form of a software product. The computer software product is stored in a storage medium and includes several instructions for instructing a computer device (which may be a personal computer, a server, or a network device) to perform all or some of the steps of the method described in embodiments. The foregoing storage medium includes any medium that can store program code, such as a USB flash drive, a removable hard disk, a ROM, a RAM, a magnetic disk, or an optical disc.

What is claimed is:

1. A method comprising:

receiving a placement group creation request comprising a target application type and a target service-level agreement (SLA);

generating placement group creation guide information based on the target application type and the target SLA, wherein the placement group creation guide information comprises a partition quantity of a placement group and an instance specification of the placement group; and creating the placement group based on the placement group creation guide information.

2. The method of claim 1, wherein the target application type of a target application carried in the placement group, and wherein the target SLA is of the placement group.

3. The method of claim 1, wherein the placement group creation request further comprises a required partition quantity, a required instance specification, and a required instance quantity of the placement group, and wherein the method further comprises:

performing placement group status measurement based on the placement group creation request to obtain a placement group measurement result comprising an SLA indicator and an instance capacity status of the placement group; and providing the placement group measurement result.

4. The method of claim 3, wherein performing the placement group status measurement comprises calculating the SLA indicator based on the required partition quantity, the required instance quantity, and at least one fault rate of the placement group, wherein the at least one fault rate comprises a fault rate of each of at least one fault domain in which the instance is distributed, and wherein the fault domain is a physical fault domain of a host corresponding to the placement group.

5. The method of claim 3, wherein performing the placement group status measurement further comprises determining the instance capacity status of the placement group based on the required instance quantity and a quantity of instances that can be created in the placement group, and wherein the instance capacity status indicates a probability of an instance creation failure.

6. The method of claim 1, further comprising further generating the placement group creation guide information further based on historical creation information comprising a historical partition quantity and a historical instance specification that satisfy the target SLA.

7. The method of claim 1, wherein generating the placement group creation guide information comprises:

calculating a current SLA and a current instance capacity status of the placement group based on a first partition quantity and a first instance quantity, wherein the first partition quantity comprises one or more preset partition quantities, and wherein the first instance quantity comprises one or more preset ECS quantities; and determining, when the current SLA satisfies the target SLA and the current instance capacity status satisfies a threshold, the partition quantity based on the first partition quantity.

8. The method of claim 1, further comprising:

receiving an instance creation request comprising a quantity of instances that is requested to be created;

generating, based on the instance creation request, instance creation guide information comprising an instance capacity status of each partition in the placement group; and creating an instance in the placement group based on the instance creation guide information.

9. The method of claim 1, wherein the placement group creation request comprises a quantity of instances that is requested to be created, and wherein the method further comprises:

generating, based on the placement group creation request instance creation guide information comprising an instance capacity status of each partition in the placement group; and creating an instance in the placement group based on the instance creation guide information.

10. The method of claim 1, further comprising:

calculating an instance capacity status of each partition in the placement group based on a resource pool status, wherein the resource pool status comprises a host capacity corresponding to each partition in the placement group; and adjusting, based on the instance capacity status of each partition, a distribution of instances in a host corresponding to the placement group.

11. The method of claim 1, further comprising:

calculating an instance capacity status of each partition in the placement group based on a resource pool status, wherein the resource pool status comprises a host capacity corresponding to each partition in the placement group; and providing the instance capacity status of each partition in the placement group.

12. An apparatus comprising:

a memory configured to store instructions; and at least one processor configured to execute the instructions to cause the apparatus to:

receive a placement group creation request comprising a target application type and a target service-level agreement (SLA);

generate placement group creation guide information based on the target application type and the target SLA, wherein the placement group creation guide information comprises a partition quantity of a placement group and an instance specification of the placement group; and create the placement group based on the placement group creation guide information.

13. The apparatus of claim 12, wherein the target application type is of a target application carried in the placement group, and wherein the target SLA is of the placement group.

14. The apparatus of claim 12, wherein the placement group creation request further comprises a required partition quantity, a required instance specification, and a required instance quantity of the placement group, and wherein the at least one processor is further configured to execute the instructions cause the apparatus to:

perform placement group status measurement based on the placement group creation request to obtain a placement group measurement result comprising an SLA indicator and an instance capacity status of the placement group; and provide the placement group measurement result.

15. The apparatus of claim 14, wherein the at least one processor is further configured to execute the instructions to cause the apparatus to calculate the SLA indicator based on the required partition quantity, the required instance quantity, and at least one fault rate of the placement group, wherein the at least one fault rate comprises a fault rate of each of at least one fault domain in which the instance is distributed, and wherein the fault domain is a physical fault domain of a host corresponding to the placement group.

16. The apparatus of claim 14, wherein the at least one processor is further configured to execute the instructions to cause the apparatus to perform the placement group status measurement by determining the instance capacity status of the placement group based on the required instance quantity and a quantity of instances that can be created in the placement group, and wherein the instance capacity status indicates a probability of an instance creation failure.

17. The apparatus of claim 12, wherein the at least one processor is further configured to execute the instructions to cause the apparatus to further generate the placement group creation guide information based on historical creation information comprising a historical partition quantity and a historical instance specification that satisfy the target SLA.

18. The apparatus of claim 12, wherein the at least one processor is further configured to execute the instructions to cause the apparatus to generate the placement group creation guide information by:

calculating a current SLA and a current instance capacity status of the placement group based on a first partition quantity and a first instance quantity, wherein the first partition quantity comprises one or more preset partition quantities, and wherein the first instance quantity comprises one or more preset ECS quantities; and determining, when the current SLA satisfies the target SLA and the current instance capacity status satisfies a threshold, the partition quantity based on the first partition quantity.

19. The apparatus of claim 12, wherein the at least one processor is further configured to execute the instructions to cause the apparatus to:

receive an instance creation request comprising a quantity of instances that is requested to be created;

generate, based on the instance creation request, instance creation guide information comprising an instance capacity status of each partition in the placement group; and create an instance in the placement group based on the instance creation guide information.

20. The apparatus of claim 12, wherein the at least one processor is further configured to execute the instructions to cause the apparatus to:

generate, based on the placement group creation request, instance creation guide information comprising an instance capacity status of each partition in the placement group; and create an instance in the placement group based on the instance creation guide information.

* * * * *